(12) United States Patent
Hugosson et al.

(10) Patent No.: US 7,408,536 B2
(45) Date of Patent: Aug. 5, 2008

(54) DEVICE AND METHOD FOR COMMUNICATION

(75) Inventors: Ola Hugosson, Lund (SE); Petter Ericson, Malmö (SE)

(73) Assignee: Anoto AB, Lund (SE)

( * ) Notice: Subject to any disclaimer, the term of this patent is extended or adjusted under 35 U.S.C. 154(b) by 418 days.

(21) Appl. No.: 11/033,158

(22) Filed: Jan. 12, 2005

(65) Prior Publication Data

US 2005/0134563 A1 Jun. 23, 2005

(51) Int. Cl.
*G09G 5/08* (2006.01)

(52) U.S. Cl. .................... 345/162; 178/19.05; 382/201; 382/205; 382/314

(58) Field of Classification Search ........... 345/162, 345/166, 173, 175; 178/18.01, 18.09, 19.01, 178/19.05; 382/188, 201, 205, 312–314, 382/182, 187, 315; 358/440
See application file for complete search history.

(56) References Cited

U.S. PATENT DOCUMENTS

| | | |
|---|---|---|
| 5,051,736 A | 9/1991 | Bennett et al. |
| 5,661,506 A | 8/1997 | Lazzouni et al. |
| 5,852,434 A | 12/1998 | Sekendur |
| 5,897,669 A | 4/1999 | Matsui |
| 5,903,667 A | 5/1999 | Kuzunuki et al. |
| 6,058,498 A * | 5/2000 | Nagasaki et al. ............ 714/752 |
| 6,186,405 B1 | 2/2001 | Yoshioka |
| 6,201,903 B1 * | 3/2001 | Wolff et al. ................. 382/317 |
| 6,330,976 B1 | 12/2001 | Dymetman et al. |
| 6,502,756 B1 | 1/2003 | Fahraeus |
| 6,571,025 B2 * | 5/2003 | Nada ........................... 382/314 |
| 6,603,464 B1 * | 8/2003 | Rabin .......................... 345/179 |
| 6,864,880 B2 * | 3/2005 | Hugosson et al. ........... 345/162 |

FOREIGN PATENT DOCUMENTS

| | | | |
|---|---|---|---|
| GB | 2 306 669 A | | 5/1997 |
| GB | 2 329 300 A | | 3/1999 |
| WO | WO 99/50787 | A1 | 10/1999 |
| WO | WO 00/73983 | A1 | 12/2000 |
| WO | WO 01/16691 | A1 | 3/2001 |
| WO | WO 01/26032 | A1 | 4/2001 |

OTHER PUBLICATIONS

XP002328425: Dymetman and Copperman, Intelligent Paper, Xerox Research Center Europe; published in Apr. 1998.

* cited by examiner

*Primary Examiner*—Richard Hjerpe
*Assistant Examiner*—Tom V Sheng
(74) *Attorney, Agent, or Firm*—Birch, Stewart, Kolasch & Birch, LLP

(57) ABSTRACT

A product for electronic transmission of handwritten information, a user unit for recording and sending the information, and a computer program for controlling a user unit are disclosed. The product may include at least one writing area for the handwritten information and an address area indicating an address to which the handwritten information is to be sent. A position-coding pattern in the form of a plurality of symbols may be reproduced in the writing area, an arbitrary position area of a predetermined size of the position-coding pattern unambiguously defining a position on the product. The address area may include an address-coding pattern with a plurality of symbols, an arbitrary address portion of a predetermined size of the address-coding pattern unambiguously defining part of the address.

19 Claims, 7 Drawing Sheets

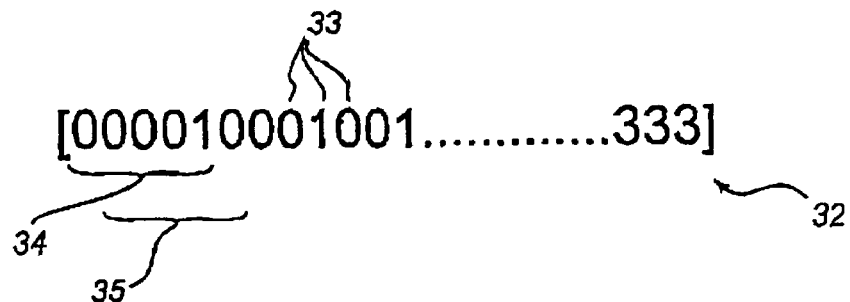
Fig. 4
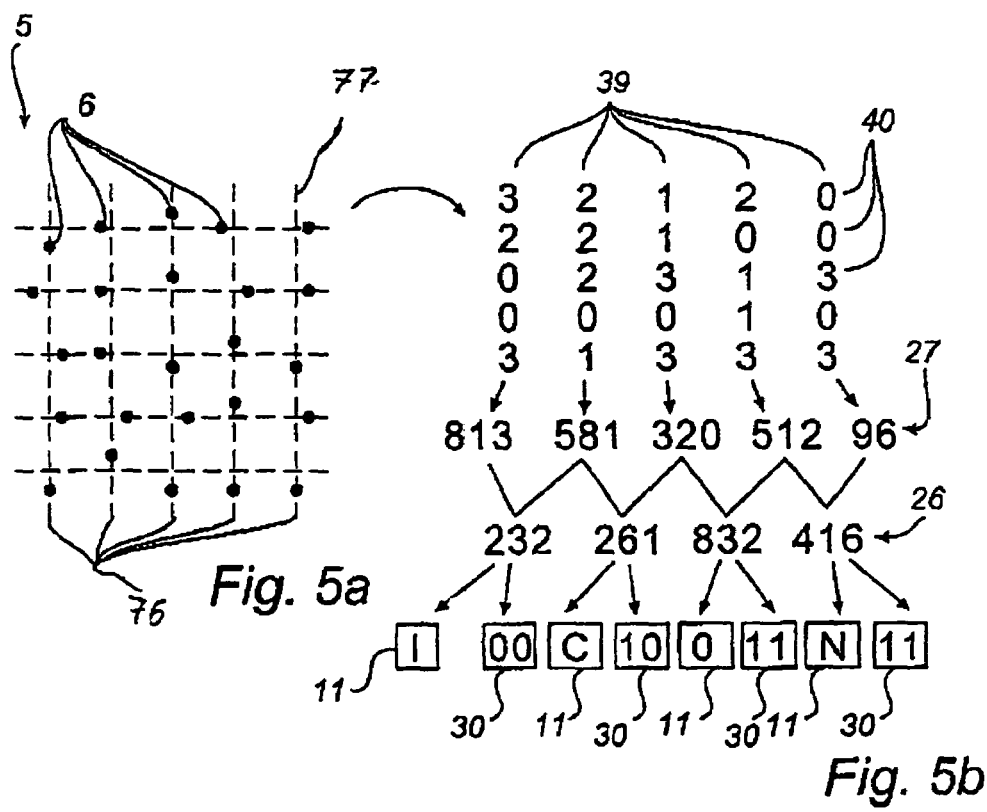
Fig. 5a
Fig. 5b

DEVICE AND METHOD FOR COMMUNICATION

CROSS-REFERENCE TO RELATED APPLICATIONS

This application claims priority benefits based on Swedish Patent Application No. 0000940-7, filed Mar. 21, 2000, U.S. Provisional Application No. 60/208,166, filed May 31, 2000, and U.S. patent application Ser. No. 09/813,114, filed Mar. 21, 2001 now U.S. Pat. No. 6,684,880, the technical disclosures of both of which are hereby incorporated herein by reference.

FIELD OF THE INVENTION

The present invention relates to a method and apparatus for electronically transmitting handwritten information.

BACKGROUND OF THE INVENTION

The amount of information transmitted electronically has increased in recent years. Most of the information transmitted electronically has been generated by means of a computer. There is, however, a great need for electronically transmitting information that has been generated in some other way than by means of computers. For instance, there is a need for transmitting handwritten information in connection with the filling-in of a form. A further example when there is a need for transmitting handwritten information involves advertisements in newspapers. Advertisements in newspapers sometimes have a writing area for handwritten information and a fax number to which the advertisement can be sent.

For a long time the only possibility of sending handwritten information was to use a fax machine. An alternative is to use a scanner for converting the information to a digital image, which can then be transmitted via a computer communication link or via the telephone network. U.S. Pat. No. 5,852,434 discloses a method for entering handwritten information by means of a pen and a base with a coordinate pattern. When writing on the base, the pen records the movement and stores it as positions.

Independently of how the information is entered, a manual step is necessary when transmitting the information.

There is thus a need for an alternative method and a device for more easily transmitting handwritten information such as handwritten text.

SUMMARY OF A FEW ASPECTS OF THE INVENTION

There is provided a product for electronic transmission of handwritten information comprising at least one writing area for the handwritten information. The writing area comprises a position-coding pattern comprising a plurality of first symbols. An arbitrary position area of a predetermined first size of the position-coding pattern unambiguously defines a position on the product.

The product further provides an address area indicating an address to which the handwritten information is to be sent. The address area comprises an address-coding pattern comprising a plurality of second symbols. An arbitrary address portion of a predetermined second size of the address-coding pattern unambiguously defines part of the address.

There is further provided a method for entering handwritten information and transmitting the handwritten information. The method comprising reading an input signal corresponding to a recorded image, converting the recorded image to at least one position and storing the position based on a position-coding pattern corresponding to the recorded image; converting the recorded image to at least one character and storing the character based on an address-coding pattern corresponding to the recorded image, and transmitting stored positions to an address corresponding to characters stored in the memory.

Still further, there is provided a user unit for electronic transmission of handwritten information comprising a reading head adapted to optically record images from a surface; a memory; means for converting the recorded image to at least one position and storing the position in the memory based on a position-coding pattern contained in the recorded image which codes at least one position; means for converting the recorded image to at least one character and storing the character in the memory based on an address-coding pattern contained in the recorded image which codes at least one character, and means for transmitting at least part of positions stored in the memory to an address corresponding to characters stored in the memory.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. The figures are not according to scale and some dimensions are greatly exaggerated to show more clearly specific features of the invention.

FIG. 4 shows a sequence that is used to code the coding patterns according to an embodiment of the present invention.

FIGS. 5a and 5b illustrate a conversion of the address-coding pattern to an address in accordance with an embodiment of the present invention.

DESCRIPTION OF PREFERRED EMBODIMENTS

Figure 1:
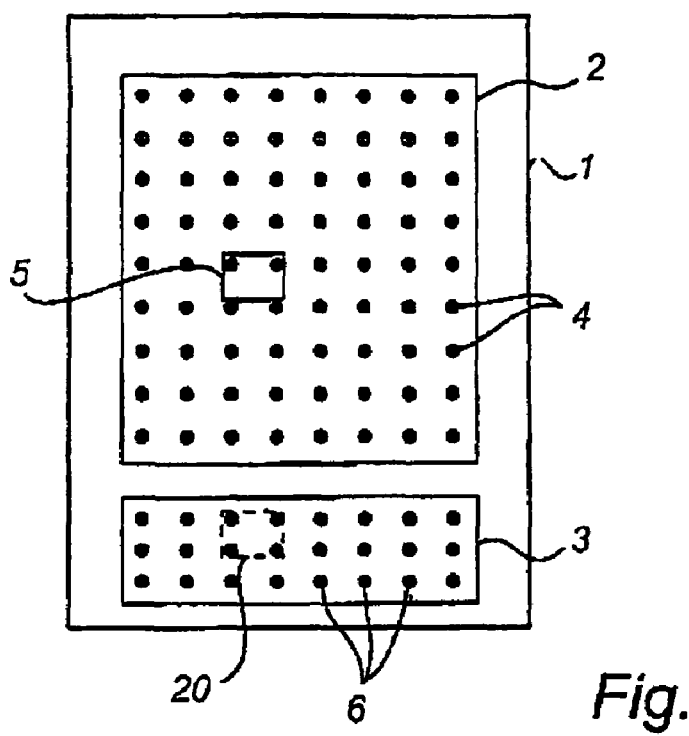
FIG. 1 illustrates a product according to an embodiment of the present invention.

A product for electronic transmission of handwritten information according to the present invention may be used in connection with at least one writing area for the handwritten information and an address area, which indicates an address where the handwritten information is to be transmitted. The product may be constructed with a position-coding pattern in the form of a plurality of symbols in provided in the writing area. Furthermore, an arbitrary position area of a predetermined size of the position-coding pattern may unambiguously define a position on the product. Still further, the address area may include an address-coding pattern with a plurality of symbols wherein an arbitrary address portion of a predetermined size of the address-coding pattern unambiguously defines part of the address.

The product including a writing area and/or address area may include a sheet of paper in a newspaper but may also include an information board. Indeed, the invention in its broadest sense is not limited to any particular form of product.

Position-coding patterns are known from, for instance, U.S. Pat. No. 5,852,434. In the present invention, a writing area with a position-coding pattern makes it possible to enter information in the writing area with a user unit while at the same time record a position sequence corresponding to the movement of an information reader, such as a pen. As a result, the handwritten information may be recorded while being written on the sheet of paper. Since the address area contains an address-coding pattern, it may be possible to read the address where the handwritten information is to be sent by recording the information with a user unit adapted to enter the address-coding pattern and the position-coding pattern. The position-coding pattern may thus define a large number of positions, with each position being associated with a different part of the writing area.

The size of the position area required to unambiguously determine a position from the position-coding pattern may be advantageously at least the same as the size of the address area required to unambiguously determine part of the address from the address-coding pattern. It may therefore be possible to adapt a user unit to the position-coding pattern without taking the address-coding pattern into consideration.

The part of the address to be unambiguously determined may be an individual character. The decoding operation may be simple with the address portion of a predetermined size of the address-coding pattern unambiguously defining a character.

It is within the scope of the invention that certain characters correspond to a special command. For instance, a character may constitute information about how the information is to be transmitted. Thus, one character may signify that the information is to be sent by electronic mail and another character may signify that the information is to be sent by fax.

The address area may contain information that defines a communication medium to be used for the transmission of the handwritten information. If the address area does not contain such information, a user unit can interpret the information in the address area and thus establish which communication medium to use. For example, all addresses containing the character "@" are interpreted as electronic mail addresses.

The position-coding pattern may define positions within a partial code area, which is part of a larger virtual code area, the address area containing information that defines the coordinates for at least part of the writing area.

The position-coding patterns on different products advantageously code different partial code areas. As a result, a user unit recording the address can determine which handwritten information is to be sent to the address. A user can write on a plurality of products in parallel without any risk that the written information is mixed up. Different companies can then reserve different partial code areas.

The address-coding pattern may contain a plurality of sequence portions with symbols, with an address portion for defining part of the address containing sequence portions of a predetermined number and a predetermined length. By the symbols being arranged in sequence portions, the recording and interpretation of the pattern may be facilitated.

Each of the sequence portions comprises at least one subsequence of a predetermined length of a sequence, where each subsequence may unambiguously define a sequence value that corresponds to the position of the subsequence in the sequence. As a result, the subsequences may be easily converted to sequence values.

The difference between the sequence value defined by a subsequence of a first sequence portion and the sequence value defined by a subsequence of a second sequence portion may be constant independently of from which parts of the sequence portions the subsequences are selected when the subsequences are fetched from corresponding parts of the sequence portions. By using differences between sequence portions, the address-coding pattern may be independent of which parts of the address-coding pattern are recorded. If the sequence portions are arranged in columns in a matrix, the address-coding pattern will be insensitive to at what height in the columns the address-coding pattern is recorded.

The difference value, which corresponds to the difference between sequence values from different sequence portions, can be represented as a binary value. A first part of the binary value may represent a character and a second part of the binary value may code a sequence position for the sequence portions in the matrix.

By the difference value coding a sequence position, the recording of the address may be facilitated since it may then be possible to record different parts of the address on different occasions and get the complete address together by means of the sequence positions. This may result in robust inputting. It may be thus possible to record different parts of the address-coding pattern on different occasions and put together the entire address by means of the sequence positions.

The symbols in the address-coding pattern may advantageously have a size different from that of the symbols in the position-coding pattern. Alternatively, the symbols in the address-coding pattern may be arranged with an interspace that is different from that of the symbols in the position-coding pattern. A user unit may thus be able to easily distinguish the address-coding pattern and the position-coding pattern.

It goes without saying that it is possible for the two patterns to differ from each other merely by the information they code. A user unit may have to then interpret the information represented by the patterns before it can determine whether it is a position-coding pattern or an address-coding pattern. The address-coding pattern cannot be interpreted as positions since the positions to which they are then decoded will not be associated with each other, which is the case of the position-coding pattern.

The address area may also code a public key, the receiver specified by the address being capable of decoding a message that has been coded by means of the public key. This may facilitate the encryption of the message that has been written manually in the writing area.

By using the above-mentioned sequences for coding the address-coding pattern, it may be possible to store long encryption keys in the address.

The address-coding pattern may alternatively be divided into a plurality of code fields, each of which corresponding to a character. An arbitrary address portion on the address-coding pattern may mean that the address portion is associated with one code field only. Each code field can, for example, define a specific code area on a virtual surface. The partial code areas on the virtual surface may then in turn be associated with different characters.

According to another embodiment, the address-coding pattern may be a bar code. However, it may not be possible to provide a bar code that can be recorded on several occasions. Besides, a bar code might be less compact.

If the address-coding pattern is divided into code fields, separating fields preferably separate the code fields. The code fields being separated by separating fields may facilitate the identification of the different code fields.

A user unit for electronic transmission of handwritten information according to the invention may include a reading head and a memory, and may be adapted to optically record images from a surface by means of the reading head. The user unit may also be adapted to convert the recorded image to at least one position and store the position in the memory based on a position-coding pattern, which codes at least one position, contained in the recorded image. Further, the user unit may convert the recorded image to at least one character and store the character in the memory based on an address-coding pattern, which codes at least one character, contained in the recorded image. Still further, the user unit may transmit at least part of the positions stored in the memory to an address corresponding to the characters stored in the memory. Handwritten information can thus easily be transmitted to a predetermined address by means of a user unit according to the invention.

A product according to the invention, together with a user unit according to the invention, can be used, for example, to order articles. A user may input an order for articles together with the user's address. When the receiver, defined by the address, receives the message, the receiver may send the ordered articles to the inputted address.

There are a number of alternatives to the way the recording of images may be initiated. According to one embodiment of the invention, the user unit comprises a pen point. The user unit is then adapted to record images as the pen point is being pressed against a surface.

The user unit may be adapted to convert a first part of characters stored in the memory to an address and a second part of characters stored in the memory to writing-area information defining a writing area, and to send only positions contained in the writing area to the address. This may prevent information that has been recorded on surfaces other than the writing area from being sent to the address.

The user unit may be adapted to attach recorded images of the address-coding pattern to a set of sequence portions, to convert the set of the sequence portions to a set of sequence values, and to convert the sequence values to characters by means of information stored in the memory.

The user unit may be adapted to attach an identification number when sending information to the address, the identification number being unique for each user unit. This permits identification of the user unit.

A computer can read a memory medium according to the invention. A computer program can be stored on the memory medium and can be used for inputting handwritten information and electronically transmitting the information. The computer program may be characterized in that it contains instructions for making the computer read an input signal corresponding to a recorded image, convert the recorded image to at least one position and store the position in response to the fact that the recorded image corresponds to a position-coding pattern, convert the recorded image to at least one character and store the character in response to the fact that the recorded image corresponds to an address-coding pattern, and transmit the stored positions to an address corresponding to the characters stored in the memory.

The above features can be combined in the same embodiment.

FIG. 1 shows a product according to an embodiment of the present invention. The product may be a sheet of paper 1, which comprises a writing area 2 and an address area 3. According to one embodiment of the present invention, the sheet of paper 1 is a page in a publication such as a newspaper. The writing area 2 comprises a position-coding pattern that may consist of a plurality of position symbols 4 arranged in a matrix. The position symbols 4 in FIG. 1 are greatly exaggerated in respect of size. A first arbitrary position area 5 of the writing area 2 unambiguously defines a position on the sheet. The address area 3 comprises an address-coding pattern with a plurality of address symbols 6. The address symbols 6 are larger than the position symbols 4, which make it possible to easily distinguish the different patterns. An arbitrary address portion 20 of the address area 3 may define a character. The position-coding pattern and the address-coding pattern may thus have the property that if an arbitrary part of the pattern of a certain minimum size is recorded, a position and a character, respectively, may be unambiguously defined. Coding pattern examples will be described in more detail below.

The position-coding pattern can be of the type as disclosed in the above-mentioned U.S. Pat. No. 5,852,434, where each position is coded by a specific symbol. However, the position-coding pattern may be advantageously of the type disclosed in Applicant's PCT applications WO 00/73983, PCT/SE00/01895, and WO 01/16691 (the technical disclosures of which are hereby incorporated in this application by reference), where each position is coded by a plurality of symbols and each symbol contributes to the coding of several positions.

The position-coding pattern may be made up of a small number of symbol types. An example is disclosed in WO 00/73983, where a larger dot represents a "one" and a smaller dot represents a "zero". Another example is disclosed in PCT/SE00/01895, where four different displacements of a dot in relation to a raster point code four different values.

Figure 2:
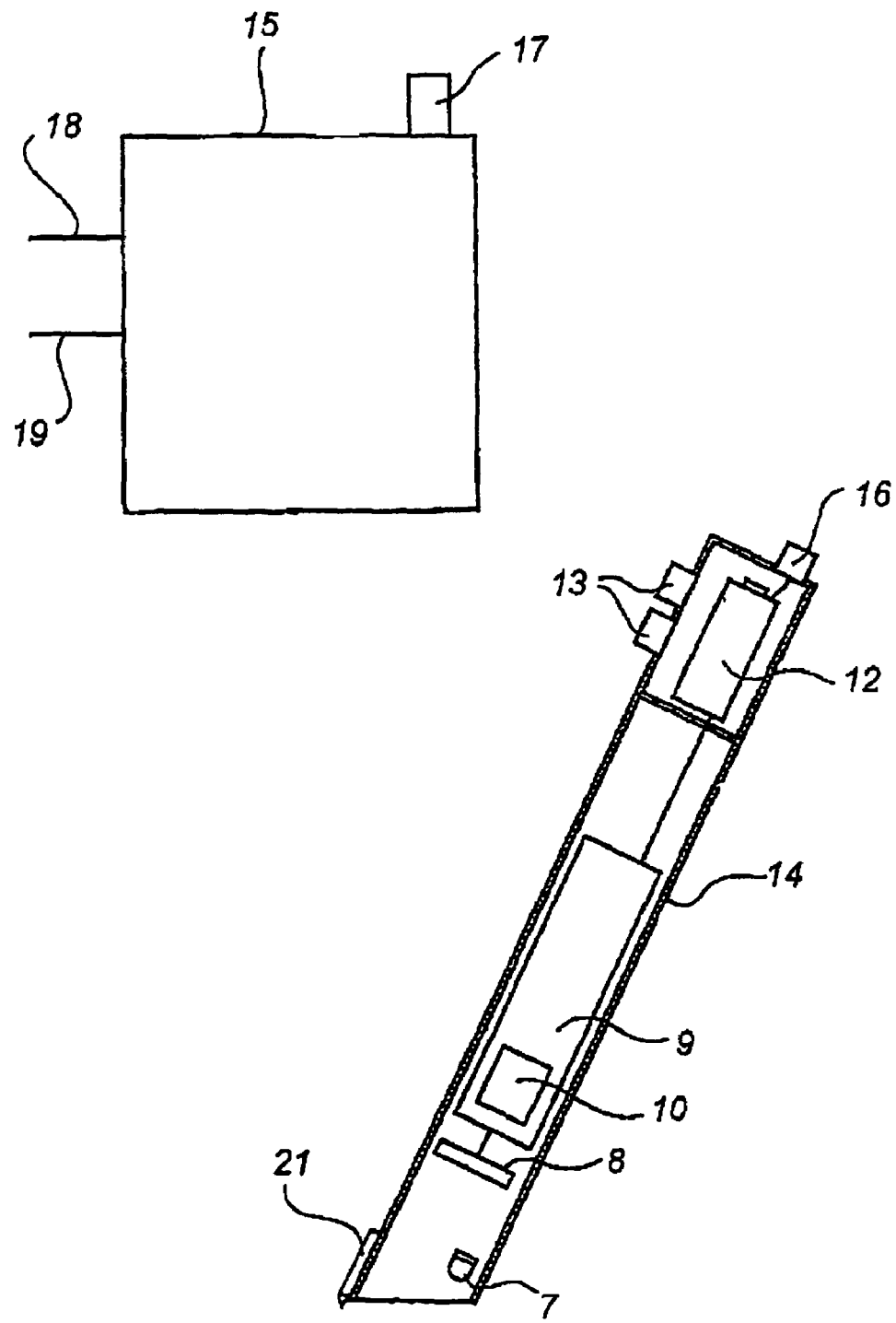
FIG. 2 shows a user unit and a communication device according to an embodiment of the present invention.

FIG. 2 illustrates an example of a user unit 14 adapted to record images from a surface. The user unit 14 comprises a light-emitting diode 7 for illuminating the surface to be recorded, an image sensor 8 in the form of a CCD for recording images, an image-processing means 9 and a memory 10. The user unit 14 may further include a battery 12 for supplying power to the reading head and buttons 13 for turning on the reading head. FIG. 2 also shows a communication device 15 in the form of a computer which may be disconnected from the user unit 14 and which may be connected to a network via cables 18, 19. In this case, the network is the public telephone network but could also be an internal network. The user unit 14 may be provided with a transmitter 16 for transmitting recorded information. The user unit 14 may transmit information to the communication device 15 that may transmit the information by the public telephone network. In the latter case, the user unit 14 may be a mobile unit in a mobile communication system and which transmits information to the mobile communication system by means of the transmitter 16. The user unit 14 may also include a pen point 21 for a user to enter information. The pen point 21 may be pressure-sensitive and connected to the image-processing means 9. When the pen point 21 is pressed against a base, recording of an image may be initiated. Thus, recording of images may be initiated when a user enters information in the writing area 2. The communication device 15 may be provided with a receiver 17 for receiving information from the user unit 14. The transmitter 16 and the receiver 17 may communicate, for example, by using IR or radio waves.

According to an alternative embodiment, the transmitter 16 may constitute a communication device which communicates with the world around via a mobile telephone system. The user unit 14 may then constitute a mobile unit in a mobile telephone system.

FIGS. 3*a*-*d* show an embodiment of a symbol that can be used in the matrix in FIG. 1 according to the invention. The symbol comprises a virtual raster point 28, which is represented by the intersection between the raster lines, and a marking 29, which has the form of a point. The value of the symbol depends on where the marking 29 is located. In the example in FIG. 3, there are four possible locations, one on each of the raster lines extending from the raster points. The displacement from the raster point is the same for all values. The symbol has in FIG. 3*a* the value 0, in FIG. 3*b* the value 1, in FIG. 3*c* the value 2, and in FIG. 3*d* the value 3. In other words, there are four different kinds of symbols. Each symbol can thus represent one of four values "0-3".

FIG. 4 illustrates a sequence 32 that is used to code the address in the address-coding pattern and positions in the position-coding pattern. The sequence 32 comprises 1024 values 33, which each are either "0", "1", "2" or "3". An arbitrary subsequence 34, 35 with five values may unambiguously define a sequence value that corresponds to the position of the subsequence in the sequence 32. Each subsequence appears only once in the sequence. Thus, the first subsequence 34 corresponds to the sequence value "0" and the second subsequence 35 corresponds to the sequence value "1". Sequences of this kind are described in "Pseudo-Random Sequences and Arrays" by F. Jessi MacWilliams and Neil J. A. Sloane in "Proceedings of the IEEE Vol. 64 No. 12 December 1976".

FIG. 5 shows part of the address-coding pattern in the address area 3 in FIG. 1. The address-coding pattern consists of a matrix 20 with symbols 6. The columns 36 in the matrix 20 consist of subsequences of the sequence that has been described above in connection with FIG. 4, in which the values have been converted to symbols.

Figure 3:
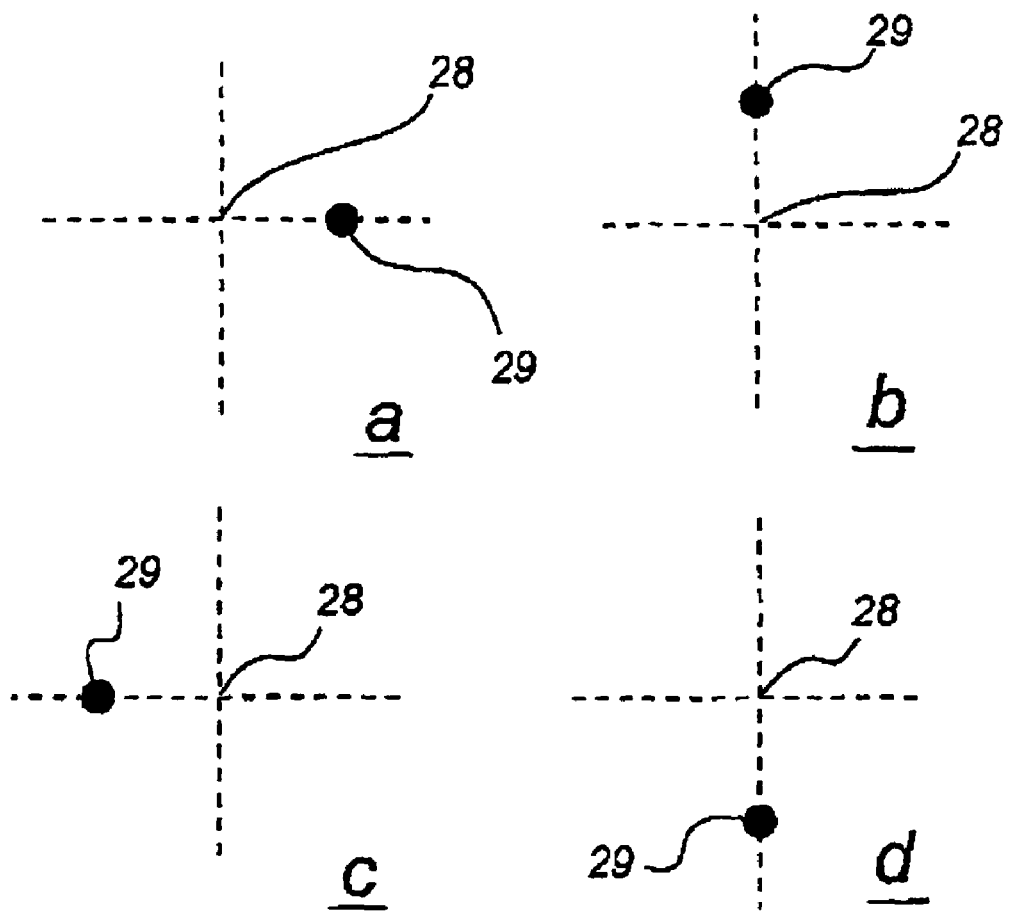
FIG. 3 shows symbols according to a preferred embodiment of the present invention.

The recording of an address from an address-coding pattern in the address area 3 will now be described with reference to FIGS. 1, 2 and 5. When the user unit 14 is passed across the address-coding pattern in the address area 3, an image of a first address portion 20 is recorded, with twenty five (i.e., five times five) symbols 6 arranged in columns 36, which each constitute a subsequence of the sequence 32. Each of the symbols 6 is one of the four different symbols that are shown in FIG. 3. Each of the symbols 6 consists of a marking that is displaced, in relation to a virtual raster point, in one of four directions. The distance between crossings in the virtual raster is 0.3 millimeters, according to this embodiment of the invention. Each marking is displaced 0.05 millimeters from its corresponding virtual raster point, while the size of a marking is 0.03 millimeters. The image-processing means 9 converts the subsequences 36 in the matrix 20 to subsequences 39 with values 40. Each subsequence 39 with values 40 corresponds to a sequence value 27 corresponding to the position in a sequence with 1024 values, where each value is either "0", "1", "2" or "3". If an image is recorded, which is displaced one row in the matrix 20, sequence values corresponding to the next position in the sequence may be obtained. The user unit 14 may convert the subsequences 39 to sequence values 27. Subsequently, the user unit 14 may calculate data values 26 as the difference modulo 1024 between the sequence values 27 for adjoining columns. By the sequence values 27 increasing to the same extent for each column if the recorded image is displaced in the direction of the column, the data values, which equal the difference between the sequence values, may be independent of the height at which the image is recorded. Then, the data values 26 may be converted to binary values and the eight least significant bits in each character value may be converted to characters 11 which are stored in the memory 10 while the two most significant bits from four adjoining character values are used as position for the columns. Thus, a total of 256 different characters can thus be coded. The characters 11 may constitute part of the address.

Figure 6:
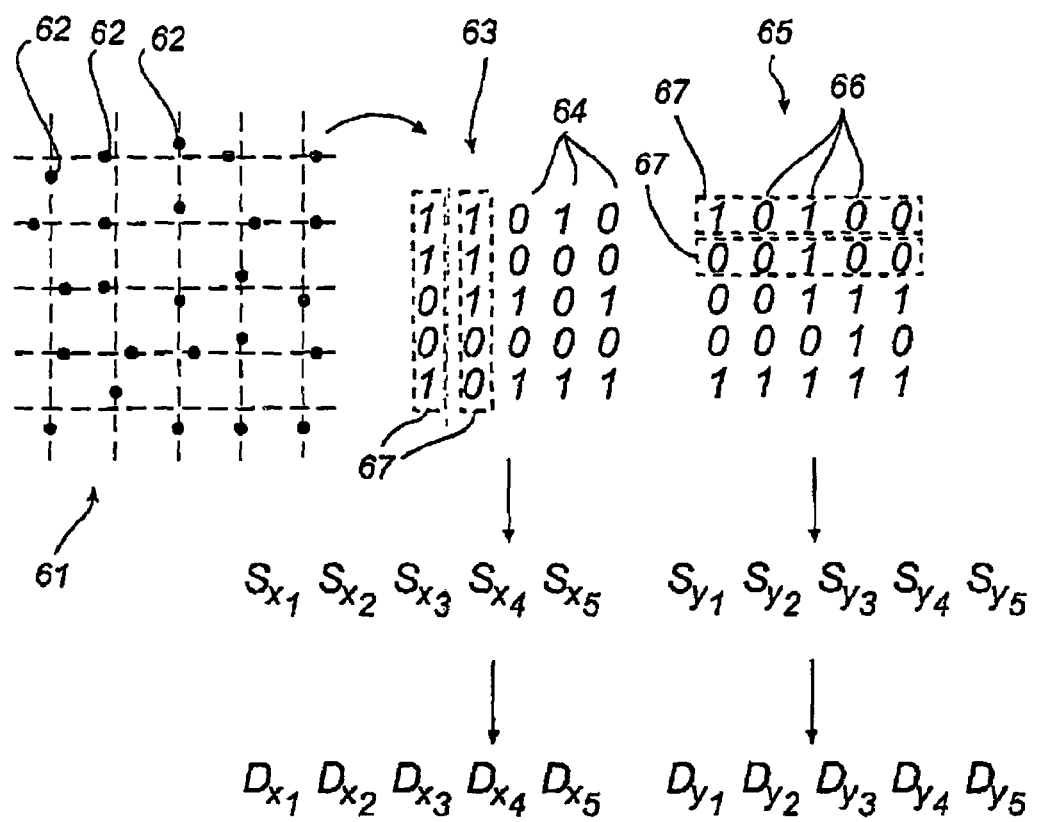
FIG. 6 shows a conversion of part of the position-coding pattern to positions in accordance with an embodiment of the present invention.

FIG. 6 shows part of the position-coding pattern in the writing area 2 in FIG. 1. The first matrix 61 in FIG. 6 is the smallest matrix that unambiguously defines a position. The position-coding pattern in the writing area 2 may be made up of symbols 62 like those shown in FIG. 3. The difference between the symbols 62 in the writing area 2 and the symbols 6 in the address area 3 may be that the symbols in the address area 3 are larger than the symbols in the writing area 2. In the position-coding pattern, the four different symbol values may be used to code a binary bit in each of two orthogonal directions. Thus, the four different symbol values, 0, 1, 2, and 3, may code the four different bit combinations (0, 0), (0, 1), (1, 0), and (1, 1), respectively, where the first digit in each bit combination relates to a first direction and the second digit relates to a second direction which is orthogonal to the first direction. When a user unit 14 records the first matrix 61 in FIG. 6, it may then be converted to a second matrix 63 with values 64, which defines the x coordinate, and to a third matrix 65 with values 66, which defines the y coordinate, based on the above relationship between symbol values and bit combinations. The second matrix 63 and the third matrix 65 contain subsequences 67 with values which may each be either "0" or "1". In the third matrix 65, the subsequences 67 may constitute rows in the matrix while the subsequences may constitute columns in the second matrix 63. Each of the subsequences 67 may be part of a writing area sequence similar to the sequence 32 shown in FIG. 4. Thus, each subsequence 67 may have a unique sequence value. Each of the matrices 63, 65 with values may be converted to a set of five sequence values $Sx_1$-$Sx_5$ and $Sy_1$-$Sy_5$, respectively, which define the position of the different subsequences 67 in the sequence. Then the difference between adjoining sequence values may be calculated, resulting in two sets of four difference values $Dx_1$-$Dx_4$ and $Dy_1$-$Dy_4$, respectively, where $Dx_n = Sx_{n+1} - Sx_n$ modulo R, where R is the number of unique subsequences in the writing area sequence and $Dy_n = Sy_{n+1} - Sy_n$ modulo R. Subsequently, the difference values may be used to generate an x coordinate and a y coordinate.

Figure 7:
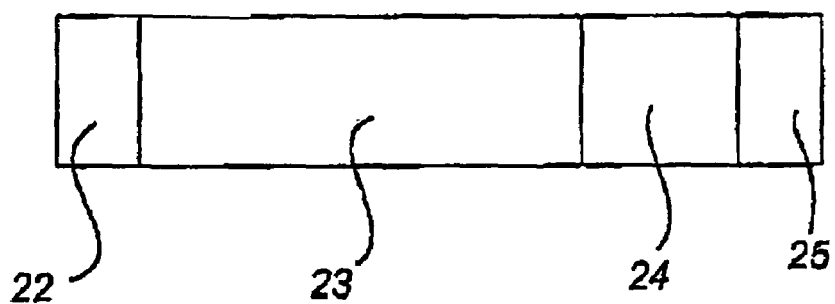
FIG. 7 shows an example of a fundamental composition of an address area in accordance with an embodiment of the present invention.

FIG. 7 is a schematic view of the contents in the address area 3. The address area may contain a communication part 22 which specifies which communication medium is to be used, a character part 23 which specifies the address, a code part 24 which specifies a public key which can be used to encrypt a message that has been written manually in the writing area 2, and a position part 25 which defines a partial code area in the writing area. The receiver defined by the address may decrypt the message that has been encrypted with the public key.

According to a preferred embodiment, the product may constitute a page in a publication, such as a newspaper. For instance, the writing area 2 and the address area 3 may be part of an advertisement offering readers to buy a product. The writing area 2 is intended for entering the address where the product is to be sent. When a user begins to enter information in the writing area 2, the CCD records images which are transmitted to the image processing means 9. The user unit 14 may be arranged so that the recorded images at least contain such a number of symbols that the position on the sheet of paper can be determined. The image processing means 9 may recognize that the pattern in the image corresponds to a position-coding pattern and may convert the pattern in a submatrix to a position that is stored in a position sequence in the memory 10. As long as the pen point 21 records that the pen point 21 is pressed down, new images may be recorded. If the user interrupts his writing and then once more begins to write in another position than the one where he stopped, the position sequence will define a discontinuous curve.

When the user scans the reading head across the address area 3, images are recorded and sent to the image processing means 9, which recognizes that the pattern in the image corresponds to the address-coding pattern in the address area 3. The image processing means 9 may convert the symbols in the recorded image to characters, which may be stored in a string of characters in the memory 10. The conversion from symbols 4, 6, 62 to characters has been described above. When the pen point 21 no longer records a pressure, the recording of images may be terminated. The position sequences stored in the memory 10, which are associated with the area that is specified by the position part 25, may be encrypted by means of the public key, defined by the code part 24, and sent to the address defined by the character part 23. According to a preferred embodiment of the present invention, an identification number may also be transmitted with the encrypted position sequence. The identification number is unique for each user unit 14. A receiver can identify the customer by means of the identification number.

According to a preferred embodiment, the user unit 14 may distinguish the different parts in the address area 3 with separating characters. Alternatively, the number of characters in each part of the address area 3 may be predetermined. The user unit 14 may thus easily determine when part of the address area is finished.

Figure 8:
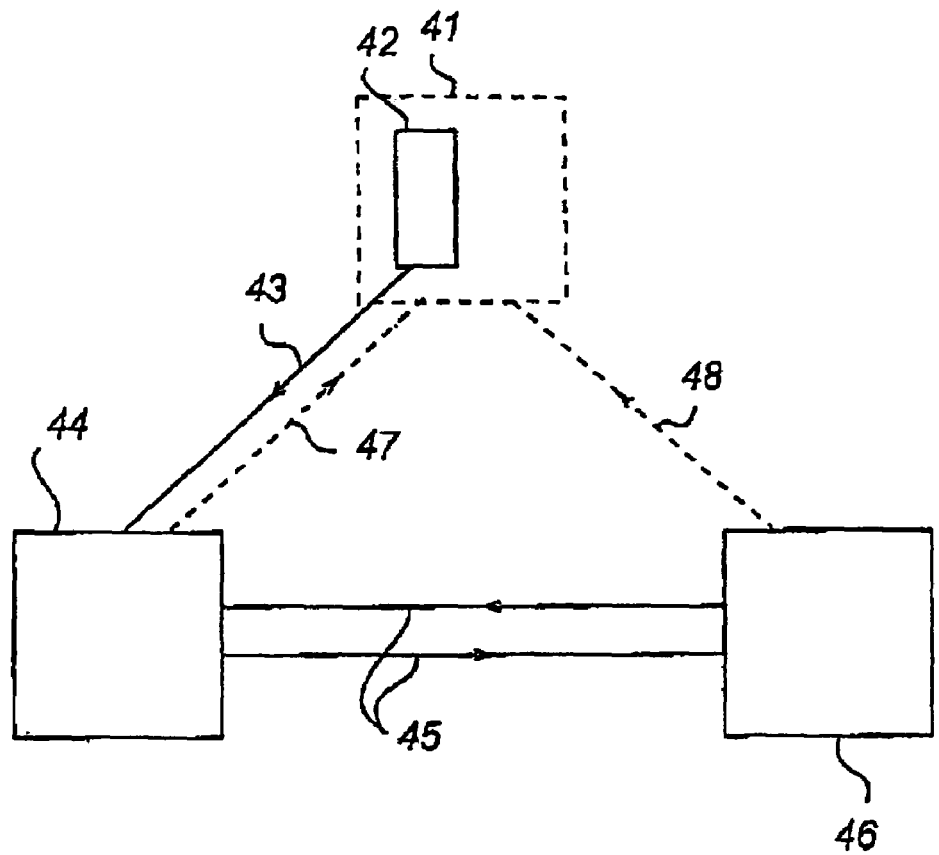
FIG. 8 shows schematically an ordering operation in accordance with an embodiment of the present invention.

FIG. 8 shows schematically how a user unit 14 and a product according to the invention can be used. A user 41 may input a message in a writing area on a product by means of a user unit 42, as described above. The user unit 42 may send encrypted position sequences together with an identification number to a receiver 44, who is a florist, for example, via a communication link 43. The position sequence may correspond to a handwritten address with a greeting. The receiver 44 may then send flowers and the greeting to the handwritten address. The receiver 44 may then consult a database 46 via a communication link 45. In this example, the database 46 is not located with the receiver 45. The receiver 44 may obtain information from the database thus allowing the receiver to send an invoice to the user 41 (as indicated by the dashed line 47, or the invoice is sent from the database to the user 41, which is indicated by the dashed line 48), whereupon the receiver 44 obtains payment from the database 48.

An alternative field of application is to enter the answer to a question in a competition in the writing area 2 in the product 1. When the user 41 then scans the user unit 14 across the address area 3, the answer entered is transmitted to the receiver together with the user unit's 14 identity. Then the receiver can in the same way as above consult the database to find out the identity of the user unit 14 and send prize money, if any, to the owner.

Figure 9:
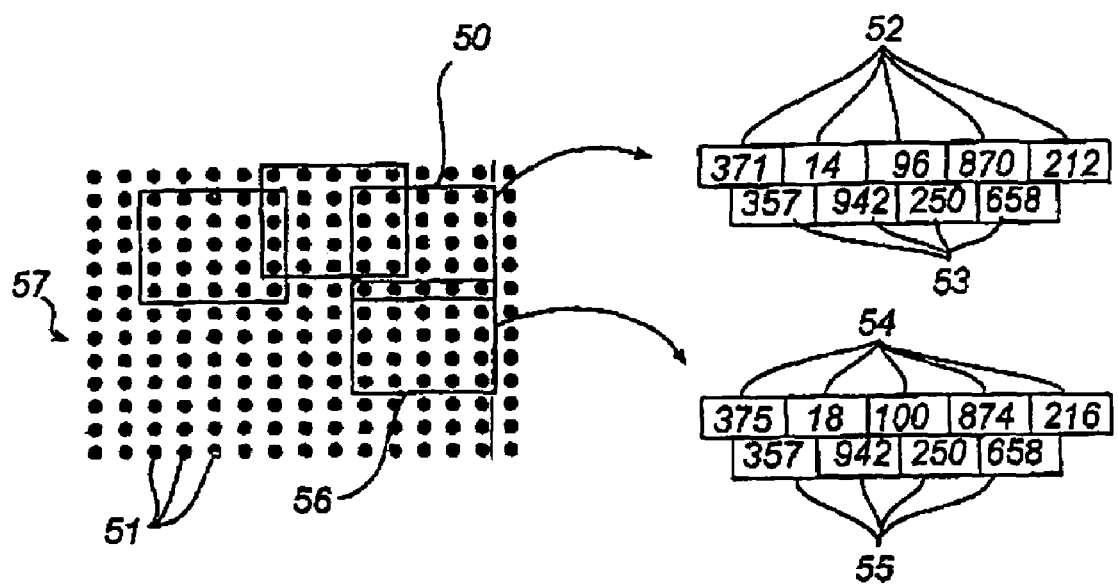
FIG. 9 shows a conversion of part of the address-coding field at different heights in the address area in accordance with an embodiment of the present invention.

FIG. 9 illustrates how information from images recorded at different heights in the address area 3 may be processed. The first image 50 contains five times five symbols. The symbols 51 are converted to symbol values as described in connection with FIG. 5. The symbol values in the columns are then converted to sequence values corresponding to the position of the subsequence in the sequence. The five subsequences with symbols corresponding to the columns in the first image 50 are thus converted to a first set of five sequence values 52. The first set of five sequence values 52 is then converted to a first set of difference values 53, which in turn is converted to characters in the same way as described in connection with FIG. 5.

When a third image 56 containing five times five symbols is recorded, the five subsequences consisting of five symbols are converted to a second set of five sequence values 54. The second set of five sequence values 54 is then converted to a second set of difference values 55, which in turn is converted to characters in the same way as described in connection with FIG. 5. Each of the sequence values 54 in the second set is four units greater than the sequence values 52 in the first set since they are fetched further down in the sequences of which the sequence parts constitute a part. However, each of the difference values 53 in the first set of difference values is the same as the corresponding difference value in the second set of difference values. Thus, the difference values are independent of at what height in the address area 57 the images are recorded.

Figure 10:
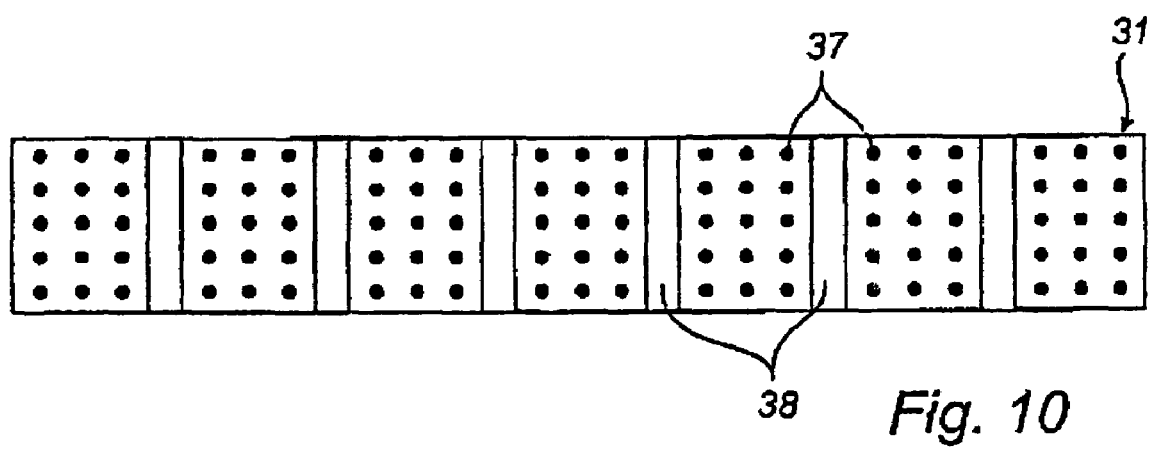
FIG. 10 shows schematically an address area according to an alternative embodiment of the present invention.

FIG. 10 shows an address area 31 according to an alternative embodiment of the present invention. As illustrated, the address area 31 is divided into a number of subareas 37, which each may comprise a position-coding pattern. Each subarea 37 may thus define a partial code area on a virtual surface. The subareas 37 may be separated by separating fields 38. The user unit 14 may have in its memory information about which character is associated with a certain partial code area on the virtual surface. When the user unit 14 records a separating field, it can therefore determine that it has reached the next character in the address area. The drawback of this embodiment is that the address may be less compact.

The above embodiments are to be considered examples only. The above embodiments can be varied in a number of ways without departing from the inventive idea. For instance, the communication device and the reading device can be an integrated unit. Each symbol can define a number with a base other than four. It is within the scope of the invention that the address area merely comprises the code field, the user unit, for example, being adapted to always use the same communication medium. The size of the address-coding pattern that unambiguously defines a part of the address is not necessarily critical to the invention. Thus, depending on how the address is defined, the size of the address-coding pattern may vary considerably. The size of the markings and their displacement in relation to the virtual raster may be different from that mentioned above.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Concurrently filed with the application for this patent are applications entitled Systems and Methods for Information Storage based on Swedish Application No. 0000947-2, filed Mar. 21, 2000, and U.S. Provisional Application No. 60/207, 839, filed May 30, 2000; Secured Access Using a Coordinate System based on Swedish Application No. 0000942-3, filed Mar. 21, 2000, and U.S. Provisional Application No. 60/207, 850 filed on May 30, 2000; System and Method for Printing by Using a Position Coding Pattern based on Swedish Application No. 0001245-0, filed on Apr. 5, 2000, and U.S. Provisional Application No. 60/210,651, filed on Jun. 9, 2000; Apparatus and Methods Relating to Image Coding based on Swedish Application No. 0000950-6, filed on Mar. 21, 2000, and U.S. Provisional Application No. 60/207,838, filed on May 30, 2000; Apparatus and Methods for Determining Spatial Orientation based on Swedish Application No. 0000951-4, filed on Mar. 21, 2000, and U.S. Provisional Application No. 60/207,844, filed on May 30, 2000; System and Method for Determining Positional Information based on Swedish Application No. 0000949-8, filed Mar. 21, 2000, and U.S. Provisional Application No. 60/207,885, filed on May 30, 2000; Method and System for Transferring and Displaying Graphical Objects based on Swedish Application No. 0000941-5, filed Mar. 21, 2000, and U.S. Provisional Application No. 60/208,165, filed May 31, 2000; Online Graphical Message Service based on Swedish Application No. 0000944-9, filed Mar. 21, 2000, and U.S. Provisional Application No. 60/207,881, filed May 30, 2000; Method and System for Digitizing Freehand Graphics With User-Selected Properties based on Swedish Application No. 0000945-6, filed Mar. 21, 2000, U.S. Provisional Application No. 60/207,882, filed May 30, 2000; Data Form Having a Position-Coding Pattern Detectable by an Optical Sensor based on Swedish Application No. 0001236-9, filed Apr. 5, 2000, and U.S. Provisional Application No. 60/208,167, filed May 31, 2000; Method and Apparatus for Managing Valuable Documents based on Swedish Application No. 0001252-6, filed Apr. 5, 2000, and U.S. Provisional Application No. 60/210,653 filed Jun. 9, 2000; Method and Apparatus for Information Management based on Swedish Application No. 0001253-4 filed Apr. 5, 2000, and U.S. Provisional Application No. 60/210,652, filed Jun. 9, 2000; Device and Method for Communication based on Swedish Application No. 0000940-7, filed Mar. 21, 2000, and U.S. Provisional Application No. 60/208,166, filed May 31, 2000; Information-Related Devices and Methods based on Swedish Application No. 0001235-1, filed Apr. 5, 2000, and U.S. Provisional Application No. 60/210,647, filed Jun. 9, 2000; Processing of Documents based on Swedish Application No. 0000954-8, filed Mar. 21, 2000, and U.S. Provisional Application No. 60/207,849, filed May 30, 2000; Secure Signature Checking System based on Swedish Application No. 0000943-1, filed Mar. 21, 2000, and U.S. Provisional Application No. 60/207,880, filed May 30, 2000; Identification of Virtual Raster Pattern, based on Swedish Application No. 0001235-1, filed Apr. 5, 2000, and U.S. Provisional Application No. 60/210,647, filed Jun. 9, 2000, and Swedish Application No. 0004132-7, filed Nov. 10, 2000, and U.S. Provisional Application No. 60/261,123, filed Jan. 12, 2001; and a new U.S. Provisional Application entitled Communications Services and Methods and Systems.

The technical disclosures of each of the above-listed U.S. applications, U.S. provisional applications, and Swedish applications are hereby incorporated herein by reference. As used herein, the incorporation of a "technical disclosure" excludes incorporation of information characterizing the related art, or characterizing advantages or objects of this invention over the related art.

In the foregoing Description of Preferred Embodiments, various features of the invention are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Preferred Embodiments, with each claim standing on its own as a separate preferred embodiment of the invention.

What is claimed is:

1. A product, comprising:
    a surface;
    a writing area on said surface;
    a first code provided on said writing area, said first code defining a plurality of absolute positions on the writing area and enabling an electronic pen to record handwritten information from the writing area in the form of a sequence of absolute positions; and
    a second code provided on said surface, said second code coding non-positional data for subsequent processing of the handwritten information, wherein the subsequent processing comprises transmission of the handwritten information recorded by the electronic pen and the non-positional data comprises at least one parameter to be used for the transmission, wherein the first and second codes each comprises a plurality of symbols representing at least two different symbol values, wherein the different symbol values are represented by displacements of the symbols in different directions from respective nominal positions on the surface.

2. The product of claim 1, wherein said at least one parameter comprises a communication medium to be used for the transmission.

3. The product of claim 1, wherein said at least one parameter comprises an address to which the handwritten information is to be transmitted.

4. The product of claim 3, wherein said at least one parameter further comprises an encryption data to be used for encryption of the handwritten information.

5. The product of claim 1, wherein said at least one parameter comprises an encryption data to be used for encryption of the handwritten information.

6. The product of claim 1, wherein said at least one parameter comprises an indication of the extent of the writing area.

7. The product of claim 1, wherein the first and second codes each comprises a plurality of symbols of identical appearance.

8. The product of claim 1, wherein the second code is spatially separate from the first code on the surface.

9. The product of claim 1, wherein the second code is provided in an address area and wherein the non-positional data comprises an address to which the handwritten information is to be transmitted and encryption data to be used for encryption of the handwritten information.

10. A product, comprising:
    a surface;
    a writing area on said surface;
    a first code provided on said writing area, said first code defining a plurality of absolute positions on the writing area and enabling an electronic pen to record handwritten information from the writing area in the form of a sequence of absolute positions; and
    a second code provided on said surface, said second code coding non-positional data for the subsequent processing of the handwritten information, wherein the first and second codes each comprises a plurality of symbols representing at least two different symbol values, wherein the different symbol values are represented by displacements of the symbols in different directions from respective nominal positions on the surface.

11. A method in an electronic pen, comprising:
imaging a first code, which defines a plurality of absolute positions on a writing area, while the electronic pen is moved over the writing area to create handwritten information;
converting the imaged first code to a sequence of positions representing the handwritten information;
imaging a second code while the electronic pen is moved over the second code;
converting the imaged second code to non-positional data, and
processing the handwritten information utilizing the non-positional data, wherein processing the handwritten information comprises transmitting the handwritten information to an external unit and wherein the non-positional data comprises at least one parameter utilized for the transmission, wherein the first and second codes each comprises a plurality of symbols representing at least two different symbol values, wherein the different symbol values are represented by displacements of the symbols in different directions from respective nominal positions on the surface.

12. The method of claim 11, wherein said at least one parameter is one of a communication medium to be used for the transmission, an address to the external unit, encryption data to be used for encryption of the handwritten information and an indication of an extent of the writing area to be utilized for determining which handwritten information to be transmitted.

13. The method of claim 11, wherein the electronic pen stores a unique identifier and further comprising adding the unique identifier to the transmitted handwritten information.

14. The method of claim 11, wherein converting the imaged first code to a sequence of positions comprises detecting a predetermined number of symbol sequences, determining the position of each symbol sequence in a predetermined longer symbol sequence used to define the first code, and decoding the non-positional data by utilizing the positions of the symbol sequences.

15. An electronic pen for recording handwritten information, which is written on a writing area provided with a first code, which defines a plurality of absolute positions on the writing area, comprising:

an image sensor for imaging the first code while the electronic pen is moved over the writing area to create the handwritten information and for imaging a second code while the electronic pen is moved over the second code; and a processor configured to convert the imaged first code to a sequence of positions representing the handwritten information, and to convert the imaged second code to non-positional data, and to process the handwritten information utilizing the non-positional data, wherein the processor's processing of the handwritten information comprises initiating transmission of the handwritten information, and wherein the non-positional data comprises at least one parameter utilized for the transmission, wherein the first and second codes each comprises a plurality of symbols representing at least two different symbol values, wherein the different symbol values are represented by displacements of the symbols in different directions from respective nominal positions on the surface.

16. The electronic pen of claim 15, wherein the non-positional data comprises encryption data and wherein the processor is further configured to encrypt the handwritten information, before transmission thereof, by utilizing the encryption data.

17. The electronic pen of claim 15, wherein the non-positional data comprises address data and wherein the processor is further configured to initiate the transmission of the handwritten information to an address indicated by the address data.

18. The electronic pen of claim 15, wherein the non-positional data comprises an indication of an extent of the writing area and wherein the processor is further configured to include in the transmission only handwritten information recorded from within the indicated extent of the writing area.

19. The electronic pen of claim 15, wherein the non-positional data comprises an indication of a communication medium and wherein the processor is further configured to initiate the transmission of the handwritten information via said communication medium.

* * * * *

UNITED STATES PATENT AND TRADEMARK OFFICE
CERTIFICATE OF CORRECTION

PATENT NO. : 7,408,536 B2  Page 1 of 1
APPLICATION NO. : 11/033158
DATED : August 5, 2008
INVENTOR(S) : Ola Hugosson et al.

It is certified that error appears in the above-identified patent and that said Letters Patent is hereby corrected as shown below:

Title page, insert item:

-- [30]    Foreign Application Priority Data

March 21, 2000   (SE) ................... 0000940-7 --

Title page, insert item:

-- [60]    Related U.S. Application Data

Divisional of Application No. 09/813,114, filed on March 21, 2001,
   now Patent No. 6,864,880, which is a Non-Provisional of Application No.
   60/208,166, filed on May 31, 2000 --

Signed and Sealed this

Twenty-first Day of October, 2008

JON W. DUDAS
*Director of the United States Patent and Trademark Office*